United States Patent
Piskiel et al.

[19]

[11] Patent Number: 5,916,307
[45] Date of Patent: Jun. 29, 1999

[54] METHOD AND STRUCTURE FOR BALANCED QUEUE COMMUNICATION BETWEEN NODES IN A DISTRIBUTED COMPUTING APPLICATION

[75] Inventors: Harold Aron Piskiel, Manalapan; Gerald Sui Mui, Fords, both of N.J.; Paolo Hendrik Natale Pelizzoli, Williston Park, N.Y.

[73] Assignee: New Era of Networks, Inc., Englewood, Colo.

[21] Appl. No.: 08/658,382

[22] Filed: Jun. 5, 1996

[51] Int. Cl.⁶ ....................................................... G06F 9/46
[52] U.S. Cl. ........................................... 709/300; 709/101
[58] Field of Search ........................ 707/1–10, 100–104; 395/671, 683, 680

[56] References Cited

U.S. PATENT DOCUMENTS

| | | | |
|---|---|---|---|
| 4,363,093 | 12/1982 | Davis et al. | 395/200.57 |
| 4,688,170 | 8/1987 | Waite et al. | 395/500 |
| 4,718,005 | 1/1988 | Fiegenbaum et al. | 395/200.52 |
| 4,751,635 | 6/1988 | Kret | 707/10 |
| 4,815,030 | 3/1989 | Cross et al. | 707/10 |
| 4,823,122 | 4/1989 | Mann et al. | 340/825.28 |
| 4,851,988 | 7/1989 | Trottier et al. | 395/200.56 |
| 4,914,583 | 4/1990 | Weisshaar et al. | 395/680 |
| 4,937,784 | 6/1990 | Masai et al. | 395/674 |
| 4,975,830 | 12/1990 | Gerpheide et al. | 395/200.58 |

(List continued on next page.)

FOREIGN PATENT DOCUMENTS

| | | | |
|---|---|---|---|
| A-41416/89 | 12/1989 | Australia | G06F 13/42 |
| A-41417/89 | 12/1989 | Australia | G06F 15/16 |
| A-79455/91 | 3/1992 | Australia | G06F 15/16 |
| 0 108 233 A2 | 5/1984 | European Pat. Off. | G06F 15/16 |
| 0 130 375 A2 | 1/1985 | European Pat. Off. | G06F 15/40 |
| 0 167 725 A2 | 1/1986 | European Pat. Off. | G06F 5/00 |
| 0 216 535 A2 | 4/1987 | European Pat. Off. | G06F 15/16 |

(List continued on next page.)

OTHER PUBLICATIONS

Birman et al.; Programming Your Way Out of the Past ISIS and the META Project; Sun Technology; Summer 1989.

Collyer; News Need Not Be Slow; Winter 1989 USENIX Technical Conference Proceedings.

(List continued on next page.)

*Primary Examiner*—Alvin E. Oberley
*Assistant Examiner*—St. John Courtney, III
*Attorney, Agent, or Firm*—Lee & Fishman; Daniel N. Fishman

[57] ABSTRACT

Methods and associated structure providing a balanced queue communication system for the exchange of messages between an originating node and a receiving node in a distributed computing environment. A balanced queue comprises a pair of wraparound (circular) queues, one each associated with the originating node and the receiving node. A message is queued by the originating node in the queue associated therewith. Background processing within the originating node retrieves message queued therein and transmits the messages to the intended receiving node. The position in the originating node's circular queue is prepended to the message and transmitted therewith. The receiving node places the received message in its circular queue in the position specified by the pre-pended location with each message. Background daemon and application processing within the receiving node then retrieves the queued messages for application specific processing. The queue control structures of the balanced queue are integrated with the transaction processing recovery management tables on each of the respective nodes to assure synchronization of the messaging queues of the balanced queue with the application specific processing. These methods and structures of the balanced queue assure robust exchange of messages, synchronized with the application's database, while improving the message processing performance as compared to prior solutions. Messages are delivered "exactly once" while reducing overhead (thereby improving performance) as compared to prior techniques.

21 Claims, 8 Drawing Sheets

U.S. PATENT DOCUMENTS

| | | | |
|---|---|---|---|
| 4,975,904 | 12/1990 | Mann et al. | 370/389 |
| 4,975,905 | 12/1990 | Mann et al. | 370/409 |
| 4,992,972 | 2/1991 | Brooks et al. | 345/338 |
| 4,999,771 | 3/1991 | Ralph et al. | 710/101 |
| 5,058,108 | 10/1991 | Mann et al. | 370/409 |
| 5,062,037 | 10/1991 | Shorter et al. | 395/670 |
| 5,073,852 | 12/1991 | Siegal et al. | 395/680 |
| 5,101,406 | 3/1992 | Messenger | 370/349 |
| 5,187,787 | 2/1993 | Skeen et al. | 395/680 |
| 5,212,768 | 5/1993 | Itsuki et al. | 706/50 |
| 5,212,792 | 5/1993 | Gerety et al. | 395/701 |
| 5,257,369 | 10/1993 | Skeen et al. | 395/680 |
| 5,396,600 | 3/1995 | Thompson et al. | 395/325 |
| 5,428,606 | 6/1995 | Moskowitz | 370/400 |
| 5,539,735 | 7/1996 | Moskowitz | 370/420 |
| 5,557,798 | 9/1996 | Skeen et al. | 705/35 |
| 5,590,334 | 12/1996 | Saulpaugh et al. | 395/683 |
| 5,832,262 | 11/1998 | Johnson et al. | 395/672 |
| 5,867,734 | 2/1999 | Drews | 395/872 |
| 5,870,627 | 2/1999 | O'Toole et al. | 395/842 |

FOREIGN PATENT DOCUMENTS

| | | | |
|---|---|---|---|
| 0 258 867 A2 | 3/1988 | European Pat. Off. | G06F 9/46 |
| 0 380 211 A2 | 8/1990 | European Pat. Off. | G06F 9/46 |
| 0 387 462 A1 | 9/1990 | European Pat. Off. | G06F 15/21 |
| 0 490 636 A2 | 6/1992 | European Pat. Off. | G06F 9/46 |
| 57-092954 | 6/1982 | Japan | H04L 13/00 |
| 63-050140 | 3/1988 | Japan | H04L 11/20 |
| 63-174159 | 7/1988 | Japan | G06F 15/16 |
| 63-214045 | 9/1988 | Japan | H04L 11/20 |
| 2 191 069 | 12/1987 | United Kingdom | G09G 1/00 |
| 2 205 018 | 11/1988 | United Kingdom | G06F 15/40 |
| WO 95/10805 | 4/1995 | WIPO . | |
| Wo 95/16235 | 6/1995 | WIPO | G06F 9/40 |

OTHER PUBLICATIONS

Henderson; The USENET System, Part One: Introductory Illuminations; 1987.

Reiss; Integration Mechanisms in the FIELD Environment; Technical Report No. CS–88–18; Department of Computer Science, Brown University, 1987.

Tanenbaum et al.; A Retrospective and Evaluation of the Amoeba Distributed Operating System; Dept. of Mathematics and Computer Science, Vrije Universiteit, 1988.

Birman et al.; Exploiting Virtual Synchrony in Distributed Systems; Dept. of Computer Science, Cornell University, Operating Systems Review: Proceedings of the Eleventh ACM Symposium on Operating Systems Principles, ACM 1987.

IBM; BASIS Application Programming Interface (API); (AKA DataTrade).

Gelernter; The Metamorphosis of Information Management; Scientific American Aug. 1989.

Schroeder et al.; Experience with Grapevine: The Growth of a Distributed System; ACM Transactions on Computing Systems, Feb. 1984.

Cheriton et al.; Distributed Process Groups in the V Kernel; ACM Transactions on Computing Systems, May 1985.

Birman et al.; The ISIS System Manual; The ISIS Project, 1988.

Gibbons; A Stub Generator for Multilanguage RPC in Heterogeneous Environments; IEEE Transactions on Software Engineering, Jan. 1987.

ISO 8824 Recommendation X.208; Specification of Abstract Syntax Notation One (ASN.1); ISO Melbourne 1988.

Birman et al.; Reliable Communication in the Presence of Failures; ACM Transactions on Computer Systems, Feb. 1987.

Lum et al.; A General Methodology for Data Conversion and Restructuring; IBM J. Res. Devel., Sep. 1976.

IBM; Revisable Form Document Conversion; IBM TDB Oct. 1985.

Gordon; Providing Multiple–Channel Communication Using the Experimental Digital Switch; IEEE Transactions on Communications, Jun. 1982.

Hughes; A Multicast Interface for UNIX 4.3; Software—Practice and Experience, Jan. 1988.

Frank et al.; Multicast Communication on Network Computers; IEEE Software, May 1985.

Skeen et al.; Reliable Message Diffusion; Teknekron, Oct. 1987.

Oskiewicz et al.; A Model for Interface Groups; ANSA ISA Project Sep. 1990.

French et al.; The Zephyr Programmer's Manual; Apr. 1989.

Eichen et al.; The Zephyr Notification Service; DEC Project Athena, MIT, Feb. 1988.

DellaFera et al.; Section E.4.1 Zephyr Notification Service; Project Athena Technical Plan; MIT, Jun. 1989.

Belville et al.; Zephyr on Athena; MIT Sep. 1991.

ISIS Distributed Systems Toolkit API.

ISIS Distributed News, ISIS Distributed Systems, Inc. 1991.

ISIS Distributed Toolkit Reference Manual pp. 17–8..17–21.

IBM; BASIS (AKA Datatrade) technical presentation slides.

Williams, P., IBM MQSeries Commercial Messaging, SIGICE Bulletin, vol. 20, No. 4, Apr. 1995, pp. 7–26.

Andreula et al., Creating an Open Systems Compatible Message Queueing System, Proceedings fo the 13th Annual International Phoenix Conference on Computers and Communications, Apr. 12–15, 1994, Phoenix, AR., IEEE, pp. 19–23.

Epstein, S.; Reasoning and Representation in RiTSE; Proceedings of the 1987 IEEE International Conference on Systems, Man, and Cybernetics, vol. 1 of 3; Oct. 20–23, 1987; pp. 135–139.

Liu et al., "Evaluation of the Intel Parago on Active Message Communication," Proceedings of Intel Supercomputer Users Group Conference, Jun. 1995.

Dolgicer, Max, "A Formal Look at Tuxedo", Data Communications, vol. 22, No. 12, pp(4), Sep. 1993.

Gray, Jim, et al., "Scale up with TP Monitors", BYTE, pp(9), Apr. 1995.

METHOD AND STRUCTURE FOR BALANCED QUEUE COMMUNICATION BETWEEN NODES IN A DISTRIBUTED COMPUTING APPLICATION

RELATED PATENTS

This patent application is related to co-pending, commonly owned U.S. patent application Ser. No. 08/779,595 entitled METHOD FOR CONTENT-BASED DYNAMIC FORMATTING FOR INTEROPERATION OF COMPUTING AND EDI SYSTEMS and co-pending, commonly owned U.S. patent application Ser. No. 08/634,024 entitled METHOD FOR DEFINING AND APPLYING RULES FOR MESSAGE DISTRIBUTION FOR TRANSACTION PROCESSING IN A DISTRIBUTED APPLICATION.

FIELD OF THE INVENTION

The present invention relates to message processing in a data processing environment, and in particular relates to a balanced queue architecture integrated with an application database to assure robust, reliable, serialized delivery of messages between nodes, while assuring synchronization with the message processing application.

PROBLEM

A large class of data processing applications combines database and distributed computing paradigms to permit physically separated users to process transactions in a database while distributing the computing loads over a network of data processing systems. It is typical in such applications that there is centralized control of critical data in a database, but portions (if not entire copies) of the central database are distributed out to remote nodes of the network to permit faster queries of the data. Local computational power at remote nodes of the network may rapidly query the local copy of the database (or portions thereof) and construct transaction messages to modify the central database and the local copy based upon the local queries. In such applications reliable communication of transaction messages between nodes is vital so as to maintain integrity of the central database. At the same time, a cumbersome communication link or protocol used to assure reliability may negatively impact the overall performance of the system (typically measured in transactions per second or TPS).

Exemplary of such distributed transaction processing systems are: financial information systems (i.e., banking and securities trading information systems), ticketing systems (i.e., travel and entertainment reservation and ticketing systems), and inventory control systems (i.e., distributed warehousing and ordering information systems). A common aspect of all these exemplary systems is the need for high performance messaging between the components of the distributed application while maintaining integrity of the central database in a distributed computing environment. For example, a financial trader working remotely for a financial institution requires rapid access to current financial statistics and therefore may utilize local computing power with local storage of a copy of the central database. However, maintaining integrity of the central database requires that transaction messages generated by such a remote trader be transmitted through the computing network in a reliable manner. In addition, distributed computing paradigms as utilized in many application areas may require that a transaction be partially processed in stages by a plurality of computing systems and/or processes. For example, in securities transaction processing, trade entry, enrichment, clearance, position keeping, securities accounting, funding, and risk/credit are typically separate application processes often operable on distinct computing systems in a networked environment.

These transaction processing applications frequently strike a balance between performance requirements and reliability requirements. For example, in some common prior designs, some performance may be sacrificed by terminating further transaction processing at a remote node until a previous transaction message is successfully transmitted to the node responsible for the central database. One methodology common to the art is the use of RPC (remote procedure calls) standards to invoke processing of a transaction at a remote node in the network. The application running at a remote node (i.e., the financial trader's workstation) generates a transaction and then invokes remote procedure calls directing another node (i.e., the receiving node containing the centralized database) to process the required transaction. When the RPC calls complete, the transaction has been processed at the receiving node. The remote node user is stalled awaiting completion of the various RPC functions to complete the transaction at the remote node. The time required to establish a communication link to another node, transmit the information relevant to the transaction, verify its proper receipt, and actually perform the required updates of the central database, is substantial compared to the local processing time at the remote node to prepare the transaction message. This communication related (RPC) processing tends to be a significant factor in limiting the transaction processing performance of such applications. Conversely, other prior designs sacrifice reliability to achieve higher message transfer rate to thereby improve overall transaction processing rates.

Most prior solutions utilize a so-called "two phase" commit architecture to maintain transaction bounding integrity in a message queuing and transmission distributed application. Two-phase commit architectures are characterized in that a sending process (message originator) sends a first phase message (often called a "prepare" message). This "prepare" message includes the relevant data in the transaction message and is sent to all remote systems/processes to which the transaction related message is to be committed. Each remote system/process responds to the receipt of the "prepare" message by performing all processing to commit the received transaction message to the local recovery management subsystem, but does not unlock the resource locked by the preparatory processing. Each receiving process sends an acknowledgment message back to the sending process to indicate its completion of the preparatory first phase of the commit process. When the sending process receives all such acknowledgments, a second phase message is sent from the sending process to all receiving processes to indicate that the locked resources may be released to thereby complete the commit processing. Such two-phase commit architectures are costly in terms of the volume of extra messages exchanged between the sending and receiving processes. In addition, two-phase commit architectures require processing by the sending process and all receiving processes to be synchronized. For example, if a single receiving node is incapable of completing either the first or second phase of the commit process due to a failure, further operation by the sending process and all receiving processes is halted (with respect to further message exchange) until the failed node recovers.

It is apparent from the above discussion that a need exists for improving the performance of message processing applications in a distributed computing environment while maintaining absolute integrity of the data content and transactional robustness in the exchanged messages. It is simply not permissible in many distributed transaction processing applications for such messages to be lost, duplicated, corrupted, or to otherwise lose their synchronization with the transaction processing application's state as a whole. In other words, reliable, robust delivery of messages in the proper sequence exactly once is critical in many distributed transaction processing applications. Simultaneously, the performance of such message queuing and exchange subsystems as measured in messages per unit of time is vitally important to maintaining the requisite performance of the overall transaction processing application.

SOLUTION

The present invention solves the above and other problems by providing methods and associated structure for improving the performance of transaction processing systems in a distributed computing environment. In particular, the present invention provides for the use of balanced queues for rapid and reliable transmission and reception of transaction messages in a distributed computing transaction processing environment. A queue data structure and associated control methods of the present invention are associated with each of a pair of cooperating application programs wishing to reliably exchange messages. Specifically, a wraparound (circular) queue is associated with the originating node of a transaction and is referred to herein as the send queue. The send queue is used to store all information required to communicate a message to the receiving node of the distributed application for further processing. The send queue is implemented as a set of tables in the transaction processing application database for the originating node of the application. A transaction message is therefore implicitly, automatically, and atomically committed to the table used for the queue when the associated transaction is committed to the application database. Since the transaction message is reliably committed to the wraparound queue, the originating node's processing may continue with further transactions as background processing proceeds in parallel to physically transmit the message to the receiving node. A background (daemon) processing element retrieves entries in the send queue and transmits them to the receiving node. Entries remain in the send queue until the receiving node acknowledges receipt of the transmitted message and commitment of the received message to persistent, recoverable storage medium.

The transaction processing application is discussed herein as being associated with an underlying database and/or well known database management subsystems. As used herein, such an underlying database or DBMS is to be understood to include any data recovery management subsystem. Current DBMS products include transaction logging and encapsulation features to permit recovery of the stored data in the database files to a saved state (often referred to as a checkpoint). Such checkpoint state processing may be used to encapsulate DBMS changes which all relate to a single transaction. The recovery methods of current DBMS products therefore permits recovery of the database storage to transaction boundaries. The methods and structures of the present invention may be utilized advantageously with many similar recovery management techniques and products presently commercially available. The term database or DBMS as used herein is broad enough to encompass all such recovery management methods, techniques, and products. For simplicity, the following discussion presents the methods and structures of the present invention as applied in the context of current, traditional database technologies which provide for recovery management capabilities. The scope of protection of the present invention as recited in the claims is therefore broad enough to read on implementations based upon any or all such recovery management techniques and products, whether integrated with traditional DBMS products or independent therefrom as a generalized recovery management subsystem.

The procedure that stores the send queue binds itself to the recovery management subsystem as an atomic portion of the sending application/process. A similar queue construct (the mate of the send queue forming the balanced queue pair) is associated with the receiving node of a distributed transaction processing application and is referred to herein as the receive queue. A message received from the originating node is stored in the receive queue in accordance with the methods of the present invention. The receive queue is implemented as tables in the transaction processing application database for the receiving node of the distributed application. A received message is committed to the table used for the queue before its receipt is acknowledged to the sending daemon to thereby assure that the received message is persistently stored and thereby ultimately synchronized with the status of the sending transaction database. Since the transaction message is reliably committed to the wraparound queue, the acknowledgment of the message is returned from the receiving node to the originating node signifying to the originating node that the message may be removed from the send queue. A background (daemon) processing element monitors the receive queue to start the receiving application processing upon receipt of a message. The receiving application retrieves entries from the receive queue and performs appropriate processing associated with the desired transaction. Entries remain in the receive queue until the receiving node application fully processes (and commits) the associated transaction.

The above features of the present invention assure synchronization of the message processing with the transaction processing of the distributed application. Other aspects of the send and receive balanced queues and associated control methods of the present invention improve performance while assuring serialization and uniqueness of the delivered messages. The send and receive balanced queues may be dynamically reconfigured to a size appropriate to the required application. However, they are assured to be identically sized as measured by the number of messages capable of being stored therein.

An entry in the send queue is placed in the next available location in the circular (wraparound) queue. An index value indicative of the relative offset location of the stored entry is transmitted with the message when the associated message is transferred from the originating node to the receiving node. The receiving node places the received message in the same relative offset location of the receive queue indicated by the transmitted index value. There is no additional processing required within the receiving node to assure that the received message in sequence (to assure serialization of the exchanged messages).

If the received message is a duplicate of an earlier transmission, there is no risk under the methods of the present invention that the message will be processed more than once. If the duplicate message has already been processed by the receiving node, then placing it in the same location of the receive queue already processed by the receiving node does no harm and is simply ignored. The location will be overwritten by a new message when another message is transmitted from the originating node using the same index value (i.e., after the wraparound queue properly wraps). If the duplicated message is stored in a receive queue location yet to be processed by the receiving node, then it truly is a duplicate of the message content already stored therein (i.e., a retry transmission). Data integrity, uniqueness, and serialization is thereby maintained in all situations.

These methods of managing the balanced queues of the present invention assure reliable, serialized, synchronized, transmission of messages in a distributed transaction processing application while reducing negative impacts on performance common to prior methods. This paradigm of message exchange may be referred to herein as "exactly once" delivery to suggest the features described above. Specifically, a message is delivered exactly once from the sending process to each receiving process. The message is therefore assured to be transferred once (guaranteed delivery) and only once (duplicates eliminated).

To further improve the performance of the present invention as compared to prior systems, the receive and send queues of the present invention may be locked in physical RAM memory of the respective application processing nodes to avoid delays due to mass storage access (such as virtual memory swapping, etc.). The queue may be dynamically resized as required to balance performance with memory requirements for a particular application.

The queues and associated methods of the present invention also assure reliable and robust message delivery. A transaction message, once committed to the remote nodes' send queue, is assured to be delivered to the receiving node once and only once. In addition, the present invention assures that the messages will be delivered in the same sequence in which they are entered in the send queue. This reliability is achieved without the added overhead of special, complex commands or interfaces for transaction message handling as known in the art. Rather, the queues are integrated with the tables of the application database. This assures that the state of the queues will always be consistent with the state of the application database.

An atomic operation which commits a transaction to the originating node's application database also commits the transaction message to the send queue thereby assuring its eventual reliable and robust transmission to the receiving node. Conversely, the reception of a message commits the entry to the receive queue. Processing of the received message by the application program clears the entry from the send queue and commits the resultant receive queue update as a transaction synchronized with the receiving application's transaction processing.

DETAILED DESCRIPTION OF THE INVENTION

Figure 1:
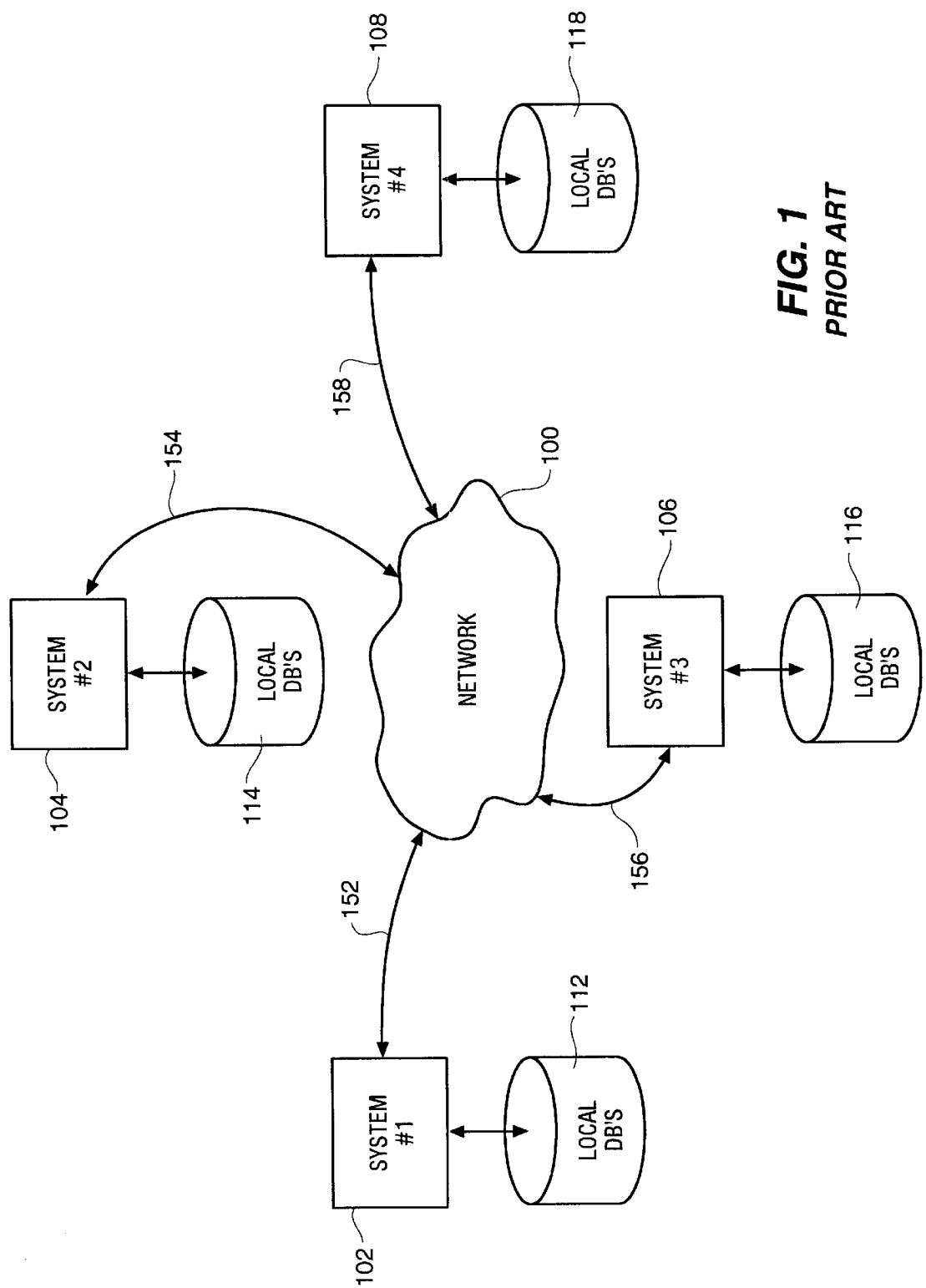
FIG. 1 is a block diagram of a distributed computing environment in which the methods and the structures of the present invention may be advantageously applied.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Distributed Application—Overview

FIG. 1 is a block diagram depicting the typical distributed computing application environment in which a plurality of systems (nodes) communicate via a common network. Specifically, system #1, 102, system #2, 104, system #3, 106, and system #4, 108, each communicate with one another via network 100. Each system is connected to network 100 via its own unique network interface 152–158. In addition, each system 102–108 has access to its own local databases and storage 112–118 for rapid access to frequently used information.

In this distributed computing environment, each system 102–108 may communicate information regarding its operation to any other system 102–108 in the distributing computing environment by transmitting messages through network 100. In addition, each system 102–108 may retrieve and store information on other systems 102–108 of the distributed computing environment by transmission of messages through network 100. In such a distributed computing environment, a complex application program may be distributed as required among any or all of the systems 102–108 in the distributed computing environment. Such a distributing computing environment paradigm is well known to those of ordinary skill in the art and need not be discussed further.

It is common in such distributed computing environments that messages are transferred between the various computing systems to coordinate the distributed processing among the plurality of systems. The reliable, robust, and rapid exchange of such messages is therefore critical to reliability and performance of the distributed computing applications.

Transaction processing applications are one common class of distributed applications operable in the distributing computing environment depicted in FIG. 1 in which reliable, robust, and rapid exchange of messages is critical. Transaction processing applications typically manipulate data throughout an enterprise that may be distributed in a plurality of cities or even a plurality of countries across the globe. Further, such distributed transaction processing applications may include a heterogenous mixture of varying computer systems, recovery management subsystems and/or DBMSs, and communication protocols. Such applications have needs for manipulating common data and simultaneously require rapid transaction response at each of the local distributed nodes. To achieve both goals, it is common to use distributed computing techniques in the transaction processing application to maintain consistent centralized data available to all nodes while distributing and maintaining remote copies of frequently used data. When transactions are processed in such applications, messages are exchanged with appropriate nodes in the distributed computing environment which may require knowledge of the completion or occurrence of the transaction.

Examples of complex, distributed, transaction processing applications requiring reliable, robust, rapid exchange of messages include: financial securities and exchange transaction processing, ticketing applications, and warehousing/distribution applications. For example, in the financial securities and exchange application domain, a single securities transaction may be distributed to other applications depending upon the particular security involved, the volumes of the transaction, the trading parties, the currencies involved, the clearing agents, or any combination of those fields and other parameters. Prior designs generally utilized complex communication protocols and structures to assure reliable and robust delivery of messages generated in an originating application and transmitted to a receiving application. Such complex protocols frequently limited to performance of the transaction processing distributed application by adding significant overhead processing to the exchange of messages. Additional complexity arises in prior solutions due to the need to synchronize the message exchange with the commitment of associated transactions to the respective application database and the reconciliations needed to compensate for the lack of robustness in the message exchange architecture. For example, it is common for cooperating applications to tally with one another the number of messages sent and received using computational methods to insure against corruption or duplication of exchanged messages. Additional messages found in such a tally may be matched with missing messages found in the tally processing. This degree of interaction between cooperating application programs and processes makes the construction and maintenance of large networks for distributed applications more difficult.

The methods and structures of the present invention provide for robust and reliable message exchange while maintaining synchronization with transaction processing. Furthermore, the methods and structures of the present invention maintain high levels of performance as compared to prior solutions by reducing overhead processing associated with the message exchange.

Balanced Queue

Figure 2:
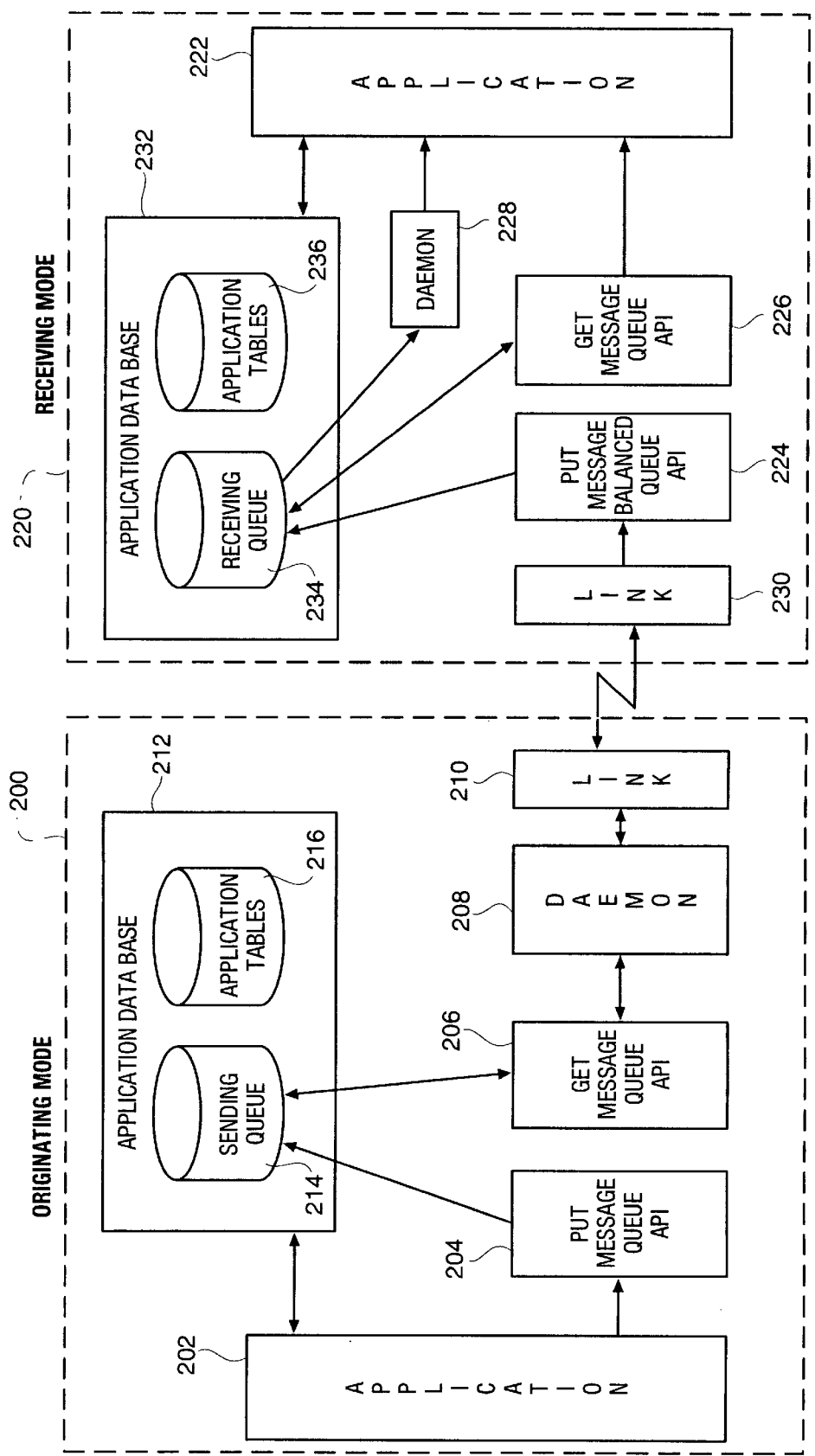
FIG. 2 is a block diagram of the use of a balanced queue structure of the present invention in communication between an originating node and a receiving node.

In particular, the methods and structures of the present invention provide for a pair of logically identical queue structures, one associated with each node of a message exchange communication path. The pair of identical queues is referred to herein as a "balanced queue." FIG. 2 is a block diagram depicting the structure of one such balanced queue establishing a message exchange communication path between an originating node 200 and a receiving node 220. There is a balanced queue established and maintained within a node for each communication path required between that node and another node in the distributed computing environment. Each queue in the balanced queue is implemented as a wraparound (circular) queue data structure. A message generated by an originating node as a result of a transaction process is placed in the wraparound queue associated with the communication path to the intended recipient node. The position within the queue is referred to herein as the "reference number" (or more simply as a "refno" or a "QRN").

An application 202 within the originating node 200 processes transactions specific to its intended application. The transactions result, for example, in processing of information stored in an application database 212 associated with the originating node 200 (e.g., an originating node may be system #1 102 of FIG. 1 with an associated local database storage 112). In conjunction with the processing of a transaction, the originating node 200 may require that a message be generated and transmitted to an identified receiving node 220. Such a message may, for example, be required to inform the identified receiving node 220 of the occurrence and completion of processing for an associated transaction within the originating node 200. The message generated by application 202 operable within the originating node 200 is then transmitted, as discussed in detail below, to the application 222 operable within the identified receiving node 220. Responsive to the receipt of such a message from the originating node 200, the application 222 in the receiving node may then process the message as required resulting in updating of information stored in its application database 232. Processing of the message by the receiving node may involve any processing including the above identified updating of the application database. The processing may also involve, for example, forwarding the received message to yet another node or process for further processing.

The functions used to maintain and utilize the balanced queue are available to applications 200 and 220 as a collection of function calls, an application program interface (API). Application 202 operable within originating node 200 invokes the put message queue API function 204 of FIG. 2 as part of its processing of a transaction to transmit a message to the application 222 operable within receiving node 220. Application 222 operable within receiving node 220, in turn, invokes the get message queue API function 226 to retrieve the message transmitted from the originating node 200.

The put message queue API function 204 is operable to place the generated message into sending queue 214 within the application database 212. Application 200 manipulates information in application tables 216 in application database 212 in conjunction with its processing of transactions. Well known database techniques permit the definition of transaction boundaries for changes within a database. All updates associated with a particular transaction may be recovered or "rolled back" to permit transaction level atomicity in the operation of the database. Sending queue 214 is stored in application database 212 in association with application tables 216 so that commitment of a transaction to the applicaiton database 212 also commits all sending queue 214 updates made in conjunction with the transaction. In this manner, the present invention assures synchronization of the message processing with the associated transaction processing. If a transaction is "rolled back" from the application database 212, all message references in the sending queue 214 are simultaneously rolled back to prevent transmission of those messages to the receiving node.

As shown in FIG. 2 and again in FIG. 3 (discussed below), sending queue 214 resides in persistent storage with the sending application database 212. One of ordinary skill in the art will readily recognize that certain control portions of the sending queue 214 (discussed below in further detail with respect to FIG. 3) reside in the application database 212 so as to maintain implicit, automatic, atomic synchronization with the sending application 202 state. The actual message storage need not be co-resident with the applicaiton database 212 depending upon the size and performance constraints of a particular application of the methods of the present invention. The actual message storage location may be elsewhere in persistent storage of the originating node 200. In such a case, it is necessary that the message be affirmatively stored in the persistent storage medium before the control portions of the sending queue 214 are committed in the application database 212.

Daemon 208 is operable within originating node 200 as a background processing task to retrieve messages committed to the sending queue 214 of the application database 212 in the originating node 200. Daemon 208 invokes the get message queue API function 206 to retrieve the next message committed to the sending queue 214 in application database 212. The next message so retrieved by daemon 208 is then passed to link level 210 for transmission to the receiving node 220. Link level 210 represents whatever processing is required to transmit the retrieved message to the receiving node 220. The required processing differs in accordance with the specific communication medium and protocols utilized for communication between the nodes. For example, the communication link level 210 may represent interface functions within a TCP/IP or Novell NetWare local area network (LAN) or a wide area network (WAN) connecting the originating node to the receiving node. Such communication functions are well known to those of ordinary skill in the arts and need not be further addressed herein.

Daemon 208 then awaits receipt of an acknowledgment from the receiving node 220 indicating successful receipt of the message. Until the acknowledgment is received the message remains in the sending queue 214 of the application database 212. Upon receipt of the acknowledgment, the transmitted message is logic removed (free for future reuse) from the sending queue 214 and the changes committed to the application database 212.

Methods for logically removing the transmitted message from the sending queue 214 are discussed below in additional detail with respect to FIG. 4. If the acknowledgment is not received within a predetermined timeout period, the message is again transmitted to the receiving node in a retry attempt. Any message handling system must implement features which prevent such a retry transmission from being misinterpreted as an original transmission and processed as such. Such a misinterpretation may cause the effects of processing the message to be erroneously duplicated.

Prior solutions provided complex communication protocols and application level reconciliation procedures to assure that a retry transmission (potentially received as a duplicate message at the receiving node) would not be reprocessed such that the information content could be confused as actually generated and transmitted a plurality of times by the originating node. As discussed in detail below, the present invention solves this problem through use of the balanced queue structures and associated management methods. A message is stored in sending queue 214 at the next available location (indicated by the refno or QRN of the location in the sending queue 214). When a message is retrieved and transmitted to the receiving node, the refno of the location of the message in the sending queue 214 is added to the message and transmitted with the message. The message is placed in the balanced receiving queue 234 in the receiving node's 220 application database 232 at the same relative offset location from which it was retrieved in the originating node's 200 sending queue 214. The receiving node 220 may thereby prevent the duplicate transmission of a message from being processed to produce duplicative effects. This aspect of the present invention is discussed in further detail below with respect to operation of the methods of the present invention.

A transmitted message received at the receiving node 220 by the corresponding link layer 230 is placed in the balanced receiving queue 234 by invocation of the put message balanced queue API function 224. As noted above (and discussed below in detail) the received message includes the refno value indicative of the relative offset location from which the message was retrieved in the sending queue 214 of the originating node 200. The put message balanced queue API function 224 is operable to place the received message in the identical relative offset location within the receiving queue 234 as that indicated by the received refno value. This feature of the present invention prevents duplicative processing of retry message transmissions received at the receiving node 220 while minimizing the overhead processing required to detect such a retransmission. In addition, this feature of the present invention permits receipt and queuing of a message within the receiving node with reduced overhead processing as compared to prior solutions utilizing more complex communication protocols and reconciliation procedures.

As noted above, and as further discussed below, receiving queue 234 is a table integrated with the application tables 236 within application database 232. The status of receiving queue 234 is therefore inherently synchronized with the state of the application tables 236 of the application database 232. The invocation of the put message balanced queue API function 224 by the link layer 230 in response to receipt of a message commits the received message to the receiving queue 234 of the application database 232 in the receiving node 220.

As shown in FIG. 2 and again in FIG. 3 (discussed below), receiving queue 234 resides in persistent storage with the receiving application database 232. One of ordinary skill in the art will readily recognize that certain control portions of the receiving queue 234 (discussed below in further detail with respect to FIG. 3) reside in the application database 232 so as to maintain implicit, automatic, atomic synchronization with the receiving application 222 state. The actual message storage need not be co-resident with the application database 232 depending upon the size and performance constraints of a particular application of the methods of the present invention. The actual message storage location may be elsewhere in persistent storage of the receiving node 220. In such a case, it is necessary that the message be affirmatively stored in the persistent storage medium before the control portions of the receiving queue 234 are committed in the application database 232.

Once the message is committed to the receiving node's 220 receiving queue 234, an acknowledgment transmission is generated and returned through link layer 230 to the originating node. As noted above, receipt of the acknowledgment by daemon 208 in originating node 200 serves to complete the processing of the message transmission by logically removing the message from the sending queue 214 of the originating node's 200 application database 212. As noted above, a message is logically removed from the sending node's 200 send queue 214 by methods discussed below with respect to FIG. 4 which manipulate control constructs of the queue.

A daemon 228 performs background processing within the receiving node 220 to assure that the application 222 is started and operable to retrieve messages received and queued on the queue table of the receiving node's 220 application database 232. Application 222 may be dormant when no messages are available for processing in receiving queue 234. Daemon 228 therefore monitors the status of the receiving queue 234 and assures that application 222 is operable to retrieve and process the queued messages. Application 222 is operable within receiving node 220 to retrieve messages queued in the receiving queue 234 of the application database 232. In particular, application 222 invokes the get message queue API function 226 to retrieve the next queued message from the receiving queue 234. The retrieved message is then processed by application 222 to produce any required changes in the application tables 236 of the application database 232. When the message processing is completed, the message is removed from the receiving queue 234 and all changes in the tables of the application database 232 are committed.

These aspects and features of the present invention reduce the overhead processing common in prior solutions for managing complex data structures to maintain the sequencing of messages to assure serialized delivery of the messages in the order generated by the originating node. The order of the message delivery is maintained by inclusion of the queue reference number of the message in the transmission to the receiving node and storing of the received message at the same relative offset location indicated by the included reference number. Reprocessing of duplicate transmissions received at the receiving node is prevented by placing the received message at the relative offset location specified by the included reference number. If the message at that location has already been processed by the application 222 in the receiving node 220, then overwriting the obsolete message is of no consequence. Similarly, if the message presently stored at the specified location in the queue table is yet to be processed by the receiving node's 220 application 222, overwriting the message with the same data is of no consequence.

The above discusses "transmitting" a message from the originating node or process to the receiving node or process. As is known in the art, a distributed computing environment or application may be physically distributed among a plurality of computing systems connected via communication networks, may be distributed among a plurality of processes within a single computing system, or any mixture of the two. Standard distributed computing paradigms encompass message exchange in all such distributed topologies. Therefore "transmission" of a message as used herein means any means for exchange or transfer of a message between an originating node or process and a receiving node or process. The transmission, transfer, or exchange of a message may be via any communication medium. As used herein, "communication medium" therefore refers to any means or medium by which the message is exchanged, including but not limited to: computer network communications, interprocess communications, etc.

The discussion below provides additional detail regarding the data structures and methods of the present invention which serve to implement the processing described with respect to the block diagram of FIG. 2.

Balanced Queue—Data Structure

Figure 3:
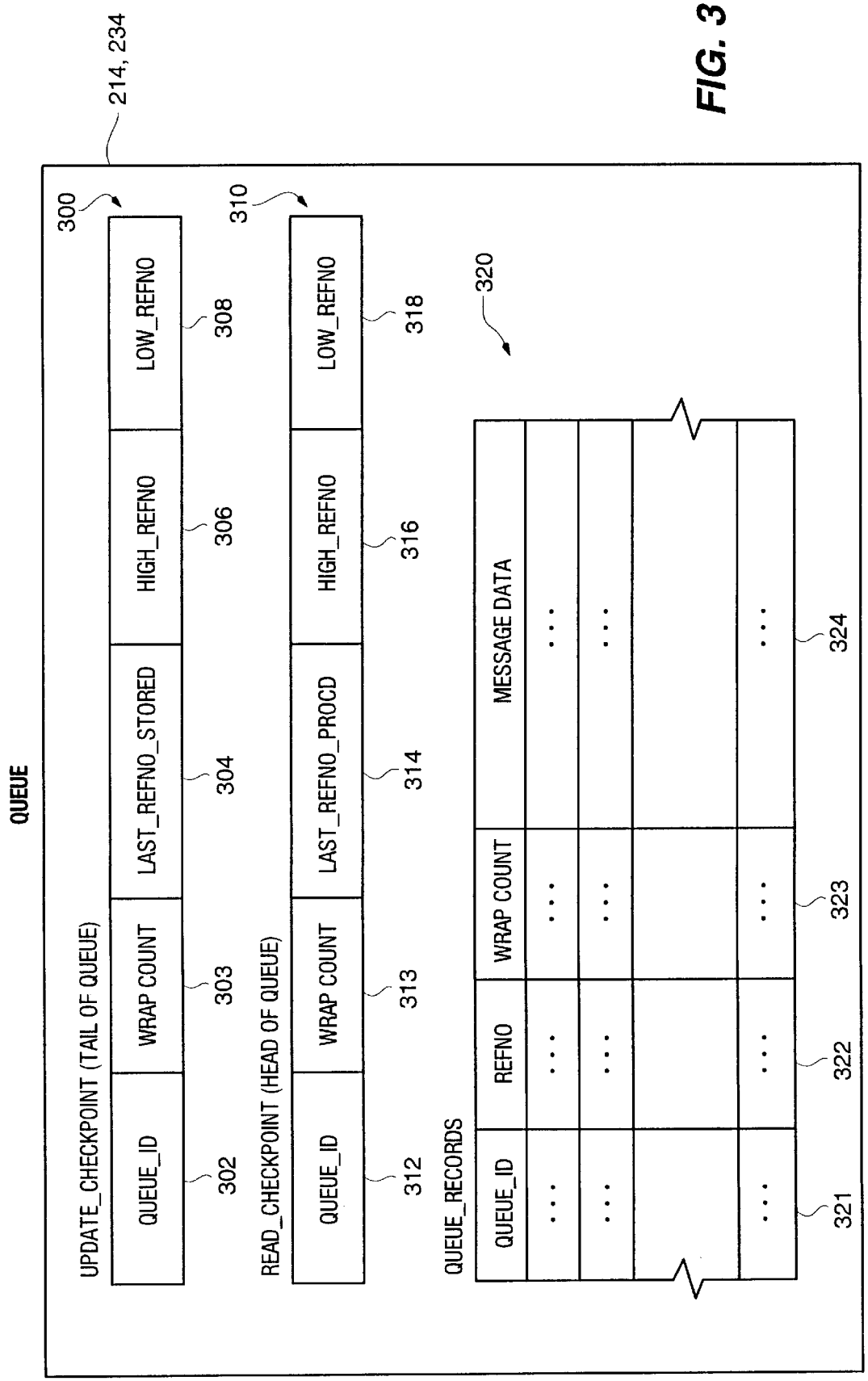
FIG. 3 is a diagram describing the database structures used to manage a queue in the balanced queue of the present invention.

FIG. 3 depicts the table structure of the queue tables 214 and 234 described above with respect to FIG. 2. Queued messages are stored in a queue_records table 320. As noted above, the actual message records in the queue_records table 320 need not necessarily be physically stored in the database tables 214 and 234 associated with the application databases 212 and 232 of the originating and receiving nodes, respectively. Rather, the queue—records table 320 may be stored in separate persistent storage of the respective nodes. As noted above, in such a case, an entry in the queue_records table 320 must be affirmatively stored in the persistent storage before the control tables (300 and 310 discussed below) are committed in conjunction with committing the underlying transactions.

Each entry in the queue_records table 320 includes a queue ID field 321, a refno field 322, a wrap count field 323, and a message_data field 324. The queue ID field 321 identifies the queue and thereby associates the queue_records table 320 entry with the control structures used to manage entries in the identified queue (namely, tables 300 and 310 discussed below). The refno field 322 contains a location identification value to identify the position in the wraparound queue represented by the entries of the queue_records table 320. The wrap count field 323 indicates the number of times the wraparound queue structure has wrapped due to utilization in conjunction with sending or receiving messages. Semantic interpretation of the wrap count field 323 and methods operable to manage same are discussed below in additional detail. The message_data field 324 contains the actual message data generated by the originating node's 200 application 202. The refno field 322 values are written once in the queue_records table 320 entries when the table is first created and initialized and need not be changed during use of the balanced queue. At initialization of the queue_records table 320, the wrap count field 323 of each entry is initialized to a starting value (typically zero) to indicate that the refno values are being used for the first time in the queue.

The entries of the wraparound queue need not be contiguous in the storage of the queue_records table 320 and therefore the refno field 322 values are used to refer to the table entries in sequence in a circular or wraparound manner. In addition, one of ordinary skill in the art will readily recognize that the rows of the queue_records table 320 may be dynamically allocated from a pool of such entries used to create a plurality of such queue tables. The queue ID field 321 identifies each record of the queue_records table 320 with a particular identified queue. This dynamic allocation capability allows significant flexibility in the size of each queue. Each queue may therefore be dynamically sized to meet the needs of the particular message exchange requirement. Conversely, one of ordinary skill in the art will also readily recognize that each queue may be statically assigned distinct storage rather than dynamically allocating the storage from a common pool. This obviates the need for a queue ID field in each record of the queue_records table 320 and may be desirable in certain applications of the methods and structures of the present invention. The preferred method for allocation of the storage corresponding to a queue is therefore dependent upon the needs of a particular application of the balanced queue methods and structures of the present invention.

The wrap count field 323 indicates the number of times all entries in the identified queue have been used (as when the refno value is incremented from a highest value to the lowest value in a circular manner). The wrap count of each queue_records table 320 entry is initialized to zero (or any fixed value). The wrap count field 323 value is used in conjunction with the refno field 322 value to uniquely identify the record to be overlaid in the queue_records table 320. When a record is added to the queue_records table 320 by operation of the put message queue API function (discussed in more detail below), the position in the queue is identified by the present value in the wrap count field 323 and by the static value of the refno field 322 of the record to be overlaid. Details of the methods which utilize the wrap count field 323 are discussed below in additional detail.

An update_checkpoint table 300 entry is associated with the queue_records table 320 to retain the information used in updating (adding) entries in the queue_records able 320. For example, the originating node's application 202 generates new messages and adds them to the queue_records table 320 by invocation of the put message queue API function 204 of FIG. 2. The put message queue API function 204 (discussed in detail below) adds the entry to the queue_records table 320 by modifying the update_checkpoint table 300 record corresponding to the queue_records table 320 to reflect the added record and overwriting the message_data field 324 of the queue_records table 320 entry.

The queue_id field 302 of the update_checkpoint table 300 entry contains an identification of the queue_records table 320 to which the entry corresponds. As noted above, an originating node has one of the pair of queues in the balanced queue for each other node with which it exchanges messages. Each such queue has a queue_records table 320 which may be identified, for example, by a unique name. The queue_id field 302 of the update_checkpoint table 300 entry therefore identifies the queue_records table 320 entries for which this checkpoint record contains pointer information. One of ordinary skill in the art will readily recognize that a single queue_records table 320 may contain the queue entries for a plurality of queues rather than creating a distinct queue_records table 320 for each balanced queue in which the node participates (either as an originator or as a receiver). In such a case, the queue_records table 320 entries may each be extended to include a queue_id field which serves to associate the records in the table with a corresponding update_checkpoint table 300 entry (related by the common queue_id field).

The last_refno_stored field 304 of each update_checkpoint table 300 entry contains the refno value of the last entry stored in the wraparound queue table identified by the queue_id field 302 value. The high_refno field 306 field and low_refno 308 field contain the highest and lowest refno values of the entries in the associated queue_records table 320, respectively. These values are utilized when the value of the last_refno_stored field 304 wraps from the highest value (high_refno) back to the lowest value (low_refno). One of ordinary skill in the art will readily recognize that refno field 322 values in the queue_records table 320 entries may begin numbering at any fixed, constant value (e.g., zero) to thereby eliminate the need for redundant storing a low_refno field 308 field value in the update_checkpoint table 300 entry for the queue.

The wrap count field 303 of each update_checkpoint table 300 entry identifies the number of times the associated queue has wrapped. As known to those in the art, the queue is said to wrap when all entries associated with the identified queue in the queue_records table have been used in sequence from low_refno through high_refno such that the next entry added reuses the low_refno index value to locate the entry to be overwritten in the queue_records table. In other words, when last_refno_stored field 304 increments from a value of high_refno to low_refno, the queue is said to have wrapped and the wrap count field 303 is incremented. The wrap count field 303 value is used in conjunction with the last_refno_stored field 304 value in locating the entry in the queue_records table 320 to be overwritten by the next added record.

A read_checkpoint table 310 entry is associated with the queue_records table 320 to retain the information used in reading (removing) entries in the queue_records able 320. For example, the originating node's daemon 208 retrieves queued messages from the queue_records table 320 by invocation of the get message queue API function 206 of FIG. 2. The get message queue API function 206 (discussed in detail below) retrieves the next unprocessed message queued entry from the queue_records table 320 and returns the record to the daemon 208. The daemon then transmits the message and awaits receipt of an acknowledgment. Upon receipt of an acknowledgment, daemon 208 logically removes the record from the queue_records table 320 by modifying the information in the read_checkpoint table 310 entry for the queue (e.g., by incrementing the last_refno_procd field value as indicated below to make the queue location again usable for storage of other messages).

The queue_id field 312 of the read_checkpoint table 310 entry contains an identification of the queue_records table 320 to which the entry corresponds. As noted above, an originating node has one of the pair of queues in the balanced queue for each other node with which it exchanges messages. Each such queue has a queue_records table 320 which may be identified, for example, by a unique name. The queue_id field 312 of the read_checkpoint table 310 entry therefore identifies the queue_records table 320 entries for which this checkpoint record contains pointer information. One of ordinary skill in the art will readily recognize that a single queue_records table 320 may contain the queue entries for a plurality of queues rather than creating a distinct queue_records table 320 for each balanced queue in which the node participates (either as an originator or as a receiver). In such a case, the queue_records table 320 entries may each be extended to include a queue_id field which serves to associate the records in the table with a corresponding read_checkpoint table 310 entry (related by the common queue_id field).

The last_refno_procd field 314 of each read_checkpoint table 310 entry contains the refno value of the last entry processed and therefore logically removed from the wraparound queue table identified by the queue_id field 312 value. Each time a message is retrieved from the queue and processing thereon is completed by the receiving application, the last_refno_procd field 314 value is incremented in a circular or wraparound fashion. This process frees the associated location in the queue_records table 320 for further use in adding another new message to the queue. The high_refno field 316 field and low_refno 318 field contain the highest and lowest refno values of the entries in the associated queue_records table 320, respectively. These values are utilized when the value of the last_refno_procd field 314 wraps from the highest value back to the lowest value. One of ordinary skill in the art will readily recognize that refno field 322 values in the queue_records table 320 entries may begin numbering at a fixed, constant value (e.g., zero) to thereby eliminate the need for storing a redundant low_refno field 318 field value in the read_checkpoint table 310 entry for the queue.

The wrap count field 313 of each read_checkpoint table 310 entry identifies the number of times the associated queue has wrapped. As noted above, the wrap count reflects the number of times the last_refno_procd field 314 has incremented from the high_refno value back to the low_refno value. The wrap count field 313 value may be used in conjunction with the last_refno_procd field 314 value to locate entries in the queue_records table 320. However, under the methods of the present invention, the wrap count value and refno stored in the queue_records entry is determined by the put message queue API function as noted above and discussed below in additional detail. The wrap count field 313 value in the read_checkpoint table 310 is therefore used in part as a check for the proper operation of the put message queue API operation. The next record to be read from the identified queue may be retrieved by exclusive use of the refno field 322 value stored therein. The wrap count field 323 value stored therein should always match the wrap count field 313 value in the read_checkpoint table 310 entry of the identified queue.

The update_checkpoint table 300 and read_checkpoint table 310 are maintained as separate tables to help avoid deadlock conditions wherein the application 202 and background daemon 208, for example, attempt to simultaneously update the same record in the same table. Maintaining two separate tables permits the daemon to update the read_checkpoint table 310 with only read access required of the update_checkpoint table 300. Similarly, application 202 may update the update_checkpoint table 300 with only read access to the read_checkpoint table 310. One of ordinary skill in the art will readily recognize other approaches to prevent such a deadlock condition. Specific data structures and associated restrictions and locking sequences of tables and resources will necessarily vary according to the capabilities and requirements of the underlying database or recovery management engine upon which the present invention is implemented. In addition, one of ordinary skill in the art will readily recognize that the data structures depicted in FIG. 3 and described above reflect structures typical of relational database models. Similar structures common to hierarchical database engines or simpler indexed file subsystems may be utilized to store the balanced queue structures described above.

Balanced Queue—Management Methods

Figure 4:
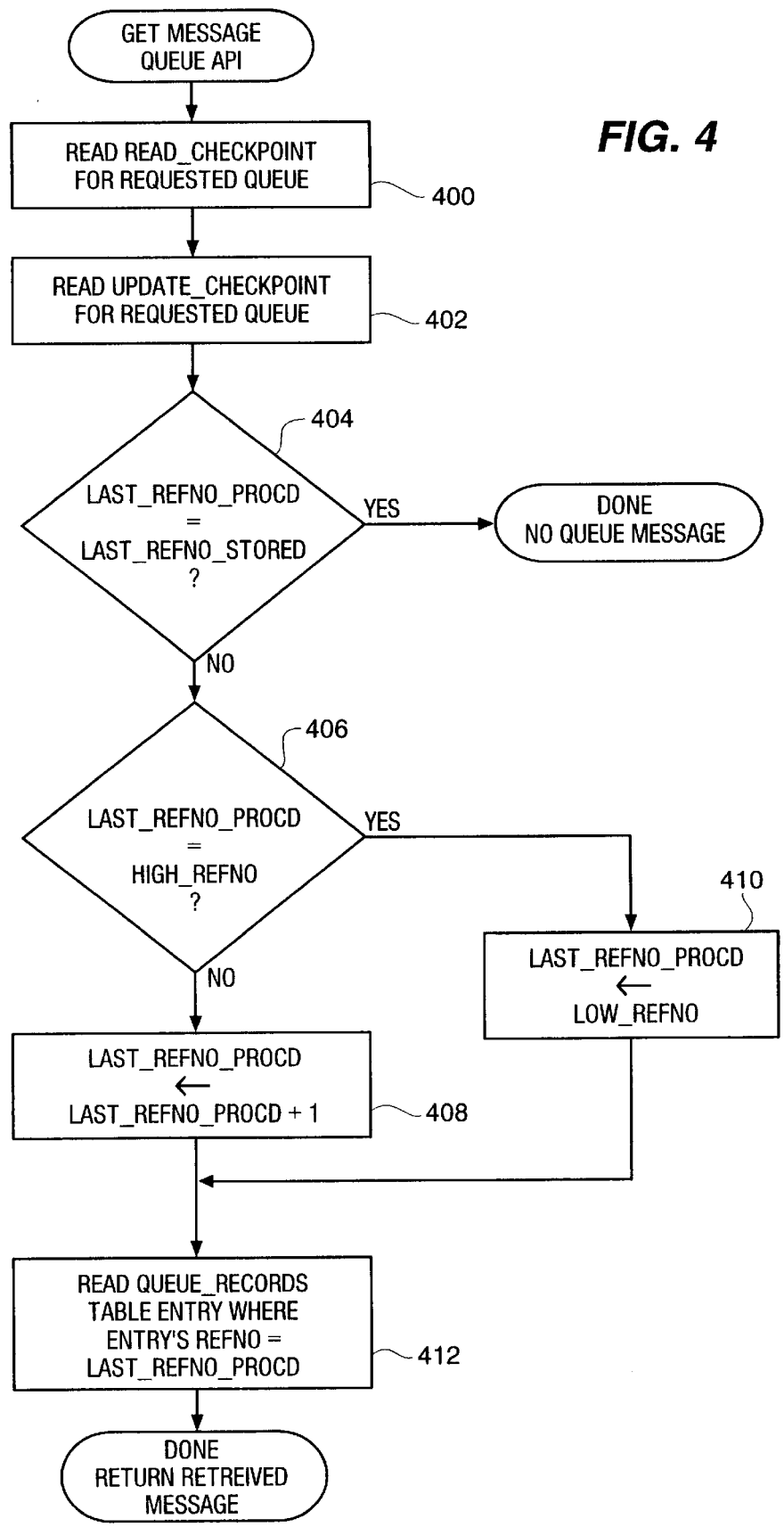
FIG. 4 is a flowchart describing the operation of methods of the present invention which implement the "get message" API function.
Figure 5:
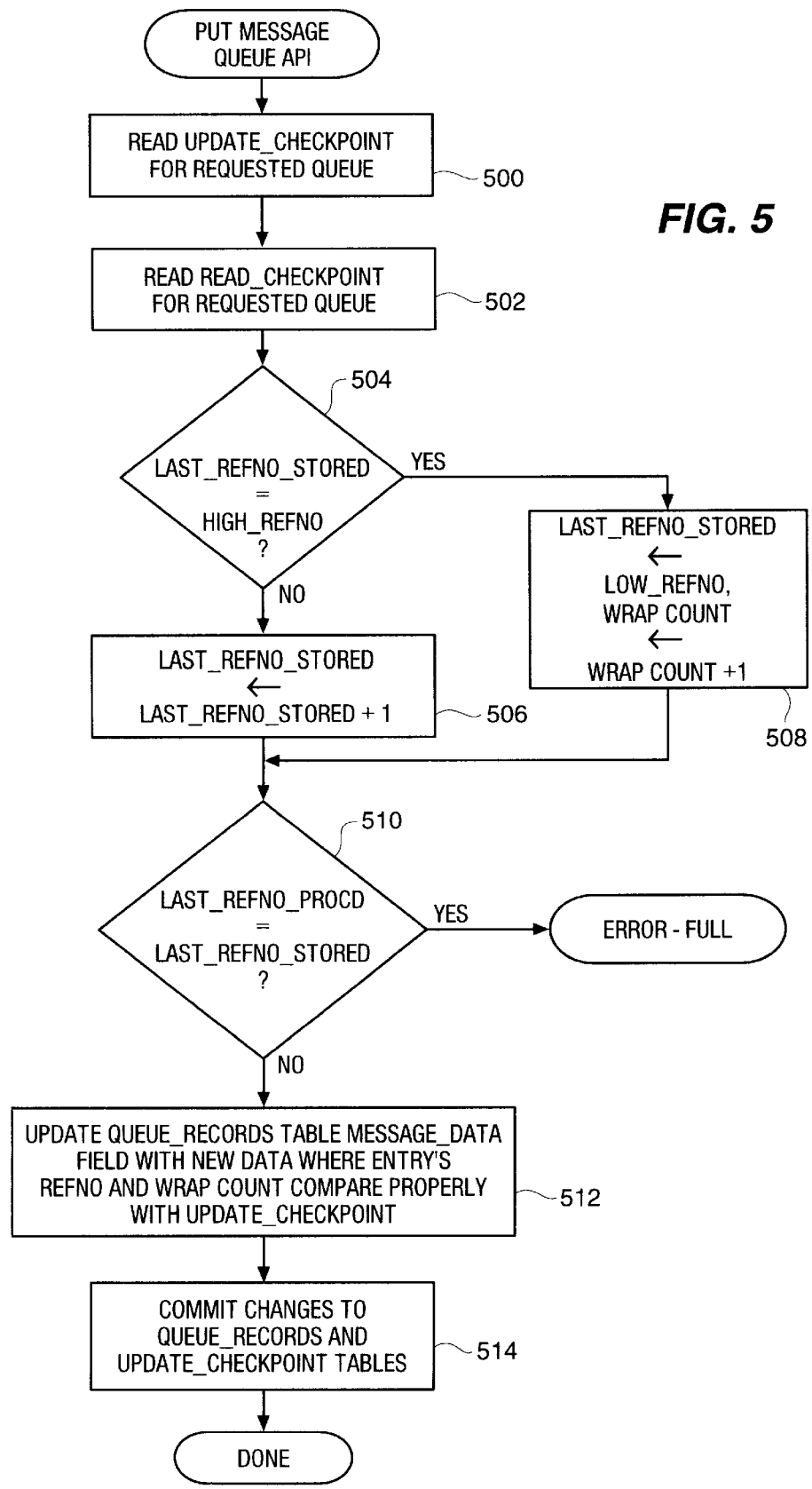
FIG. 5 is a flowchart describing the operation of methods of the present invention which implement the "put message" API function.
Figure 6:
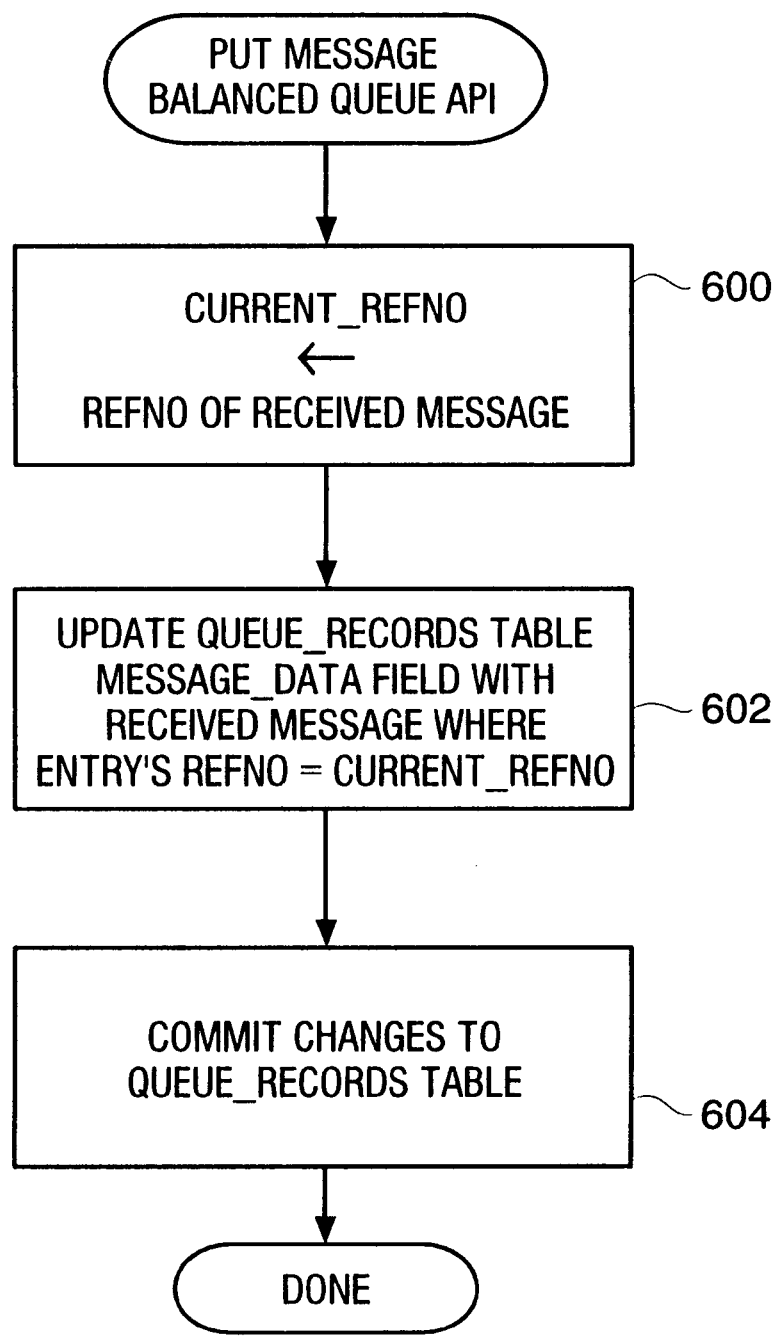
FIG. 6 is a flowchart describing the operation of methods of the present invention which implement the "put message balanced queue" API function.
Figure 7:
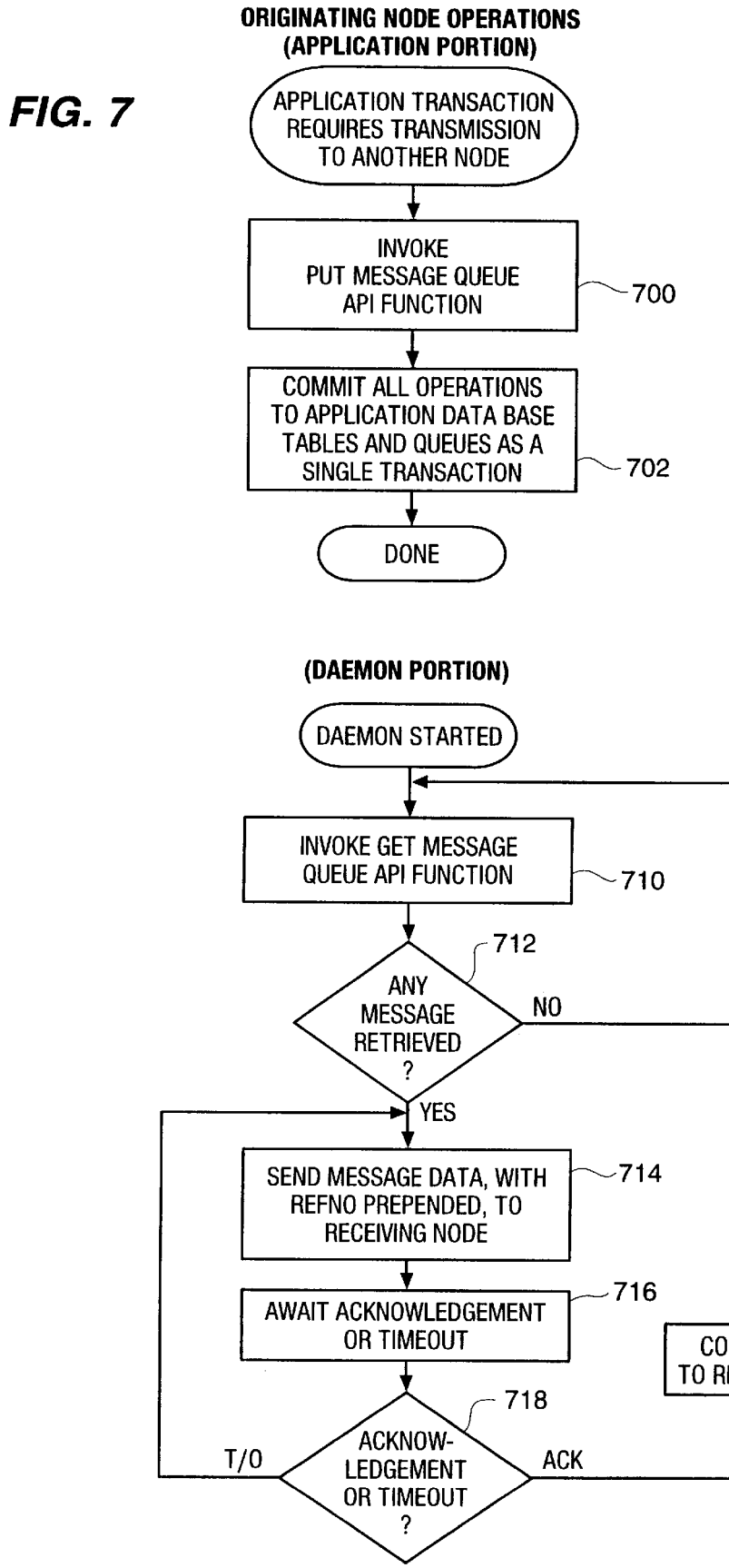
FIG. 7 is a flowchart describing the processing of the methods of the present invention operable within the message originating node.
Figure 8:
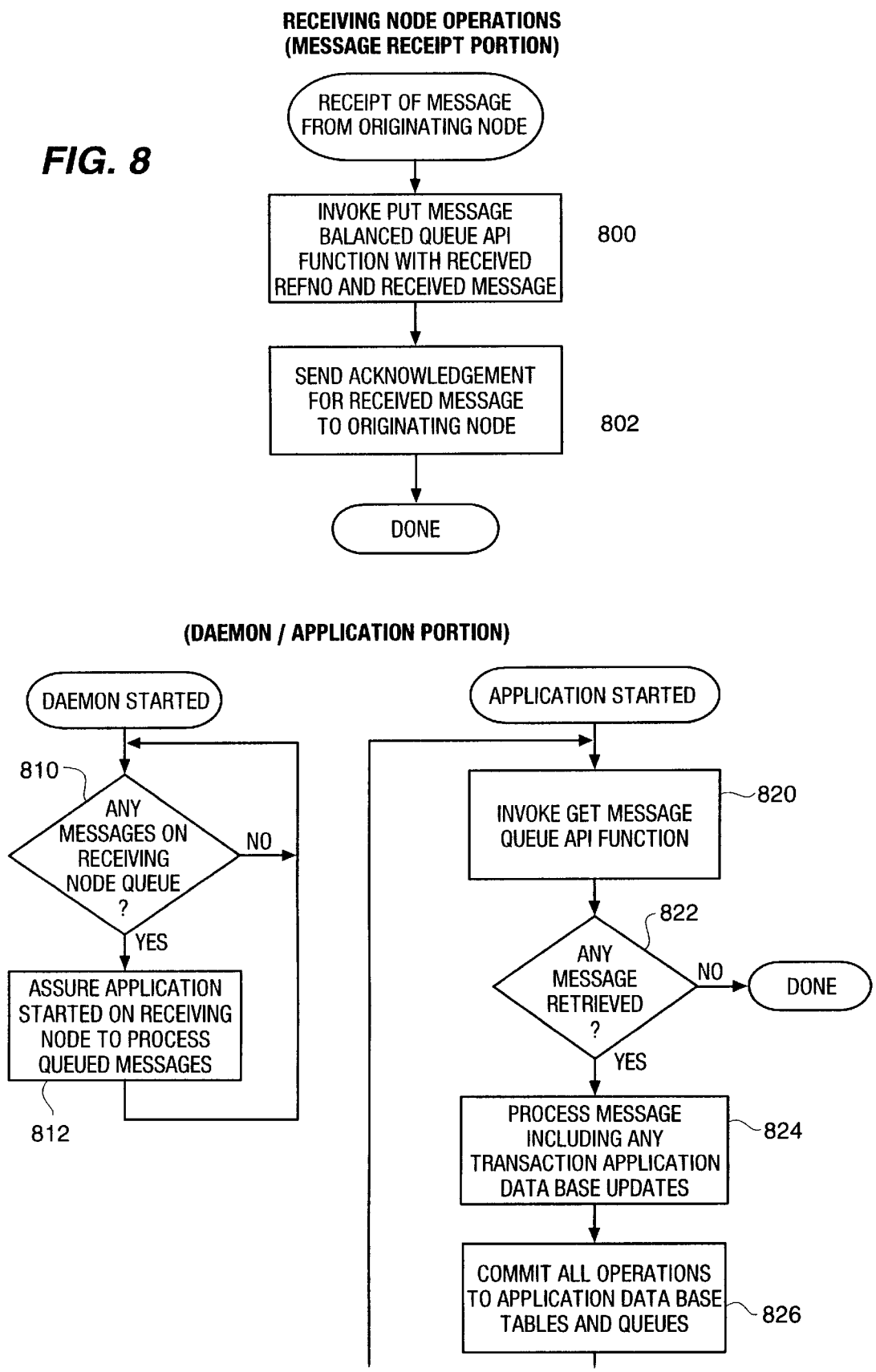
FIG. 8 is a flowchart describing the processing of the methods of the present invention operable within the message receiving node.

FIGS. 4–8 are flowcharts describing the methods of the present invention which manage the balanced queue to assure reliable, robust message exchange in a distributed computing environment while maintaining high levels of performance as compared to prior message handling solutions. In particular, FIGS. 4–6 are flowcharts describing the low level operations of the balanced queue management API which provides functions to queue and retrieve messages in the balanced queue data structures. FIGS. 7–8 are flowcharts describing the higher level operations of the applications and associated daemon processing operable in the originating node and the receiving node to exchange messages in a distributed computing environment by use of the balanced queue management API functions.

FIG. 4 is a flowchart describing the get message queue API function as utilized at elements 206 and 226 of FIG. 2 discussed above. The get message queue API function retrieves the next queued message from the identified queue supplied as a parameter to the function. If no message is queued, a return code so indicates the lack of a queued message to retrieve. Elements 400 and 402 are first operable in response to invocation of the function to read the read_checkpoint table 310 entry and the update_checkpoint table 300 entry for the identified queue. Element 404 is next operable to determine from the fields of the read read_checkpoint table record and the read update_checkpoint table record whether any messages are available in the identified queue. In particular, if the last_refno_stored equals the last_refno_procd, then all queued messages have been retrieved and no messages remain queued to be retrieved for further processing (e.g., the queue is empty). If no messages are available, processing in the function is completed and a return code is returned to the calling function to indicate that no messages are available for retrieval. As noted below, a daemon process would typically be utilized to monitor the status of a queue. When messages became available in the queue, the daemon would cause the message unqueuing and processing functions to be resumed or initiated. The test performed by element 404 may therefore be eliminated as duplicative of the processing performed by the daemon process as discussed below. The test performed by element 404 is shown only for clarity and completeness and is not a requirement of the methods of the present invention. In particular, the get message queue API function would not be invoked or activated by the daemon process unless the daemon determined that the identified queue was non-empty.

If a message is available for retrieval from the queue, elements 406–410 are next operable to increment the last_refno_procd field 314 of the read_checkpoint table 310 entry for the identified queue. The last_refno_procd field is incremented in a circular manner such that when the value surpasses the high_refno field 316 value, the next value for the last_refno_procd field 314 is the value of the low_refno field 318. Element 406 therefore determines whether the current value of the last_refno_procd field 314 is equal to the high_refno field 316. If so, element 410 sets the value of the last_refno_procd field 314 to the value of the low_refno field 318. Otherwise, element 408 increments the value of the last_refno_procd field 314 by one. Processing then continues with element 412.

Element 412 is then operable to retrieve (read) the queue_records table 320 entry whose refno field 322 value is equal to the newly updated value of the last_refno_procd field 314. The message_data field 324 of the entry so retrieved is then returned to the caller (along with the refno field 322 value) for further processing of the message.

It is to be noted that the read_checkpoint table 310 entry is not updated (the changes to the last_refno_procd field 314 are not committed) until the calling function determines that the message has been completely processed. In other words, the function calling the get message queue API function is responsible for committing the changes to the read_checkpoint table 310 after the retrieved message is completely processed. This aspect of the present invention assures eventual delivery of the queued message to its intended destination. The changes to the read_checkpoint table 310 are therefore always synchronized with the application tables 216 of the application database 212 of FIG. 2 and the messages are reliably committed to the database until successfully delivered to the intended recipient.

FIG. 5 is a flowchart describing the put message queue API function as utilized at element 204 of FIG. 2 discussed above. The put message queue API function adds another message to the identified queue supplied as a parameter to the function. If no space is available in the queue, a return code so indicates the lack of available space. One of ordinary skill in the art will recognize many standard error recovery techniques applicable to recognition of such an error. For example, the calling function can be delayed awaiting availability of space in the identified queue. It is anticipated that the pair of queue tables in the balanced queue of the present invention will be appropriately sized to preclude occurrence of such error conditions. The size of the queue tables may be defined at initialization of the balanced queue as appropriate to prevent such "overflow" errors in the particular application of the balanced queue communication link. In addition, as discussed below, the size of the balanced queue may be dynamically altered during use of the balanced queue in response to occurrence of such overflow error conditions.

Elements 500 and 502 are first operable in response to invocation of the function to read the read_checkpoint table 310 entry and the update_checkpoint table 300 entry for the identified queue.

Elements 504–508 are next operable to increment the last_refno_stored field 304 of the update_checkpoint table 300 entry for the identified queue. The last_refno_stored field 304 is incremented in a circular manner such that when the value surpasses the high_refno field 306 value, the next value for the last_refno_stored field 304 is the value of the low_refno field 308. Element 504 therefore determines whether the current value of the last_refno_stored field 304 is equal to the high_refno field 306. If so, element 508 sets the value of the last_refno_stored field 304 to the value of the low_refno field 308. In addition, element 508 is operable to increment the wrap count field 303 value of the update_checkpoint table 300 entry for the queue. The wrap count is incremented to indicate another wrap of the refno values used to store entries in the queue_records table 320. The wrap count is used as discussed below to assure that the proper record is selected for update in the queue_records table. If element 504 determines that no wrap condition occurred, element 506 increments the value of the last_refno_stored field 304 by one. Processing then continues with element 510.

Element 510 is next operable to determine from the fields of the read read_checkpoint table record and the read update_checkpoint table record whether any space is available in the identified queue for another message. In particular, if the last_refno_stored (as updated by operation of element 504–508) equals the last_refno_procd, then all locations in the identified queue are already filled with queued messages yet to be retrieved by operation of the get message queue API function discussed above. If no space is available in the identified queue, processing in the function is completed and a return code is returned to the calling function to indicate that the identified queue is full. This error condition may be handled in a variety of ways as noted above. For example, the calling function may be responsible for delaying a period of time to await available space, then repeat the invocation of the put message queue API function. Alternatively, the put function of FIG. 5 may be modified to await available space in the identified queue and return to the calling function only when space is available. One of ordinary skill in the art will readily recognize many equivalent options for the handling of the queue full error condition.

Element 512 is then operable to update the queue_records table 320 entry whose refno field 322 value is equal to the newly updated value of the last_refno_stored field 304. As noted above, a wrap count field is present in the queue_records table 320 entries as well as the checkpoint tables (300 and 310) entries. The wrap count field is used in conjunction with the refno field value to locate the record in queue_records table 320 to be overwritten with the new message. In particular, a record is selected where the refno field 322 value is equal to the newly incremented last_refno_stored field 304 of the update_checkpoint table 300 entry for the queue and where the wrap count field 323 of the queue_records table 320 entry compares properly with the wrap count field of the update_checkpoint table 300 record for the queue. The wrap count values compare properly if they are equal or if the wrap count in the update_checkpoint record is equal to the wrap count of the previous record with the previous refno value or if the wrap count in the update_checkpoint is one greater than the wrap count in the queue_records entry and the refno of the entry is equal to the low_refno value in the update_checkpoint. In other words, the wrap count value in the update_checkpoint must be equal to the queue_records entry wrap count value or correctly one greater than that value due to a wrap condition. As noted below, the wrap count of the queue_records table 320 entry selected is updated to reflect the proper current wrap count of the update_checkpoint record for the queue.

When the methods of the present invention are implemented utilizing an SQL compatible database engine, for example, the selection and update of the queue_records entry may be performed with an SQL UPDATE command having a boolean predicate WHERE clause such as the following:

(queue_records.refno=update_checkpoint.last_refno_stored) AND ((queue_records.wrap_cunt=update_checkpoint.wrap_count) OR (queue_records.wrap_cunt+1=update_checkpoint.wrap_cunt))

The message_data field 324 of the queue_records table 320 entry so selected is overwritten with the modified message data supplied by the calling function. In addition, the wrap count field 323 of the entry is updated with the current wrap count field 303 of the update_checkpoint table 300 entry for the queue. Element 514 is finally operable to commit all changes to the queue table 320 and the update_checkpoint table 300 made by operation of elements 500–512 above.

One of ordinary skill in the art will readily recognize that the use of the wrap count field to assure that the proper record is selected for update with the new message data is an optional feature of the methods of the present invention. The check of the wrap count value helps to assure the integrity and reliability of the queue structures of the present invention with a minimum of additional overhead processing.

FIG. 6 is a flowchart describing the operation of the put message balanced queue API function utilized within the receiving node as depicted in element 224 of FIG. 2 above. In the balanced queue architecture of the present invention, the queue_records table 320 (element 234 of FIG. 2) used in the receiving node 220 of FIG. 2 is identical in logical size (e.g., number of entries presently allocated) to the paired queue_records table 320 (element 214 of FIG. 2). The put message balanced queue API function of FIG. 6 is therefore simplified in its processing to select and overwrite the queue_records table 320 entry identified by the refno value pre-pended to the received message. The new message received from the originating node overwrites the message_data field 324 of the selected record. No additional processing need be performed to determine whether the received message is a duplicate transmission already processed by the receiving node Only minimal processing is required to identify the location in the queue at which the received message is to be stored. This method of the present invention reduces overhead processing typical of prior solutions while still assuring robust and reliable serialized reception and processing of messages. In particular, this aspect of the present invention guarantees delivery of a message "exactly once" while reducing the overhead processing inherent in prior techniques for message queue management.

Element 600 is operable to retrieve the refno value transmitted with the received message. The refno so retrieved is placed in the local variable current_refno for further processing. Element 602 is then operable to update the queue_records table 320 entry whose refno field 322 value is equal to the current_refno variable value (e.g., equal to the refno value transmitted with the new message. The message_data field 324 of the selected record is overwritten with the new message data received from the originating node. Finally, element 604 is operable to commit the changes made to the queue_records table 320 entry selected and updated by operation of element 600 and 602 above.

Balanced Queue—Management Methods—Originating Node Operation

FIG. 7 is a flowchart describing the operation of the originating node (e.g., 200 of FIG. 2) in generating and transmitting a message to a receiving node (e.g., 220 of FIG. 2) in a distributed computing environment. The operation of the originating node described by the flowchart of FIG. 7 builds upon the use of the API functions described above with respect to FIGS. 4–6 and may be viewed as two components, namely: the application portion (element 202 of FIG. 2) and the daemon portion (element 208 of FIG. 2).

Elements 700–702 describe the application portion of the operation of originating node 200. Responsive to other processing relating to a particular transaction, element 700 is operable within the application 202 of originating node 200 of FIG. 2 to invoke the put message queue API function (204 of FIG. 2 and described above with respect to FIG. 5). The queue corresponding to the intended receiving node and the message data to be transmitted are supplied to the API function as parameters. Following operation of the put message queue API function, element 702 is next operable to commit all changes in the application database 212 of FIG. 2 as a single transaction. This commitment of all changes to the application database 212 assures synchronization of the balanced queue communication link with the application related database tables. Committing the transaction serves to commit the message for guaranteed delivery to the intended receiving node.

Elements 710–720 describe the daemon portion of the operation of originating node 200 to transmit queued messages to the intended receiving node. Daemon processing element 208 of FIG. 2 represents background processing within originating node 200. The daemon background processing transfers messages added to the balanced queue by the application portion processing described above to the intended receiving node. The daemon processing elements may be started by initialization of the originating node 200. Element 710 is operable to invoke the get message queue API function (206 of FIG. 2 and described above with respect to FIG. 4). The return value from the get API function is then used by element 712 to determine whether any message was retrieved by the invocation of the get message queue API function. If no message was retrieved, then processing continue by looping back to element 710 to await queuing of a new message. The daemon processing is therefore continuously inspecting the state of the queue tables (214 of FIG. 2) to await queuing of another message.

Responsive to retrieval of a message from the queue, element 714 is then operable to transmit the retrieved record to the intended receiving node. Information identifying the intended receiving node associated with the queue may be stored in configuration data associated with the queue tables 214. The refno field 322 of the retrieved record and the message_data field 324 of the retrieved record are sent to the intended recipient. Element 716 then awaits receipt of an acknowledgment from the recipient or a timeout in the wait. As noted below, the receiving node will acknowledge successful receipt of the transmitted message after it has successfully added the message to the matching queue of the balanced queue in the receiving node. If the message is successfully received and committed to the balanced queue, an acknowledgment is returned to the originating node. If the message is not successfully received and committed or if the acknowledgment is not received at the originating node, then the wait of element 716 will terminate with a timeout condition.

Element 718 is next operable to determine whether the processing of element 716 completed due to receipt of the expected acknowledgment or due to a timeout condition. If the wait in element 716 resulted in a timeout condition, processing continues by looping back to element 714 to resend the message. Otherwise processing continues with element 720 to commit the changes to the read_checkpoint table 310 record associated with the queue. As noted above with respect to FIG. 4, the get message queue API function retrieves the next queued record and changes the last_refno_procd field 314 of the read_checkpoint table 310 but does not commit the changes. Element 720 therefore completes the update of the read_checkpoint table 310 entry by committing the changes made in the get message queue API function. Processing then continues by looping back to element 710 to await availability of another message in the queue to be transmitted to the receiving node.

Error conditions noted above which result in a timeout condition may be caused due to a simple communication error recoverable by a retransmission or may be caused by a fatal error in the originating or receiving nodes (an "ABEND" condition). The methods and structures of the present invention recover automatically from both simple communication failures as well as fatal "ABEND" conditions once the source of the error condition is repaired. The messages are committed to the application database (transaction processing tables) and the state of the message queue is therefore retained in the persistent storage associated therewith and is automatically recovered by the recovery management subsystems upon which the transaction processing application is implemented. When the communication failure or ABEND condition is corrected, the methods of the present invention will automatically recover the state of message processing by virtue of the committed data and status stored in the persistent storage of the distributed transaction processing files (e.g., the databases).

One of ordinary skill in the art will readily recognize that the daemon processing method of the present invention described above continually retries the transmission of each retrieved message until an acknowledgment is received. As noted above, the methods of the present invention will automatically recover from simple communication errors as well as entire system failures and restarts (to whatever extent the underlying recovery management features maintain the non-volatile nature and data integrity of the persistent storage. Standard error reporting or recovery techniques well known to those of ordinary skill in the art may be optionally employed to terminate the continuous retries after a maximum retry count is exceeded. In addition, standard pipelined communication techniques well known to those of ordinary skill in the art may be utilized to transmit a plurality of retrieved messages before waiting for the acknowledgments to thereby further enhance the message processing performance. An acknowledgment transmission may therefore include information identifying the particular message transmissions being acknowledged by the acknowledgment transmission. Further optimizations may be realized in the sequencing of locking and unlocking critical resources in the message processing methods of the present invention. Features and aspects of the underlying transaction processing recovery management subsystem will determine the precise optimizations so attainable in a particular computing environment.

Balanced Queue—Management Methods—Receiving Node Operation

FIG. 8 is a flowchart describing the operation of the receiving node (e.g., 220 of FIG. 2) in receiving and processing a message transmitted from an originating node (e.g., 200 of FIG. 2) in a distributed computing environment. The operation of the receiving node described by the flowchart of FIG. 8 builds upon the use of the API functions described above with respect to FIGS. 4–6 and may be viewed as two components, namely: the application/daemon portion (elements 222/232 of FIG. 2) and the receiving portion (element 230 of FIG. 2).

The receiving portion (element 230 of FIG. 2) is operable in response to receipt of a transmission from an originating node. Element 800 is operable to invoke the put message balanced queue API function (element 224 of FIG. 2 and described above with respect to FIG. 6) to place the received message data in the queue_records table 320 (element 234 of FIG. 2) entry identified by the received refno value. Once the received message is successfully received and committed to the queue_records table 320 (234 of FIG. 2), element 802 is then operable to transmit an acknowledgment message back the originating node 200. As noted above, operation of the transmission link layer may be extended such that the acknowledgment message may include information identifying a plurality of message transmissions acknowledged by the acknowledgment message. Such pipelined communication techniques are well known to those of ordinary skill the art.

Operation of daemon processing element 228 of FIG. 2 is described by elements 810–812 of FIG. 8. Daemon processing is operable to assure that the application processing element 222 is started in response to receipt of a message from the originating node. Application processing element 222 of FIG. 2 may remain idle or may be pre-occupied with other aspects of transaction processing until a message is received and committed to the receiving queue 234 of the receiving node. The daemon processing elements may be started by initialization of the receiving node 220. Element 810 is operable to loop until a received message is detected on the receiving queue 234 of the receiving node. When a message is so detected, element 812 is then operable to assure that application processing element 222 is started such that the queued message will be eventually retrieved from the queue and processed accordingly.

Operation of application processing element 222 is described by elements 820–826 of FIG. 8. When started (e.g., by operation of element 812 above), application processing element 222 will retrieve any queued messages and process them according to their message data content. Element 820 is first operable to invoke the get message queue API function (element 226 of FIG. 2 and described above with respect to FIG. 4). The return code value from the get message queue API function invocation indicates whether a queued message was retrieved by the function. Element 822 therefore determines whether element 820 retrieved a queued message or not. If no queued message was so retrieved, processing of the application element 222 is completed and the application processing element may return to a dormant state awaiting availability of another queued message. If a queued message was retrieved, processing continues with element 824.

Elements 824–826 are operable to process the information content of the retrieved message in accordance with the specific distributed computing environment application. Such processing may, for example, include updates to the application tables 236 of the application database 232 in the receiving node 220. Element 826 is then operable to commit all such changes made to the application database 232. This commit operation includes commitment of the changes to the read_checkpoint table 310 of the queue tables 234. As noted above, operation of the get message queue API function changes the information in the last_refno_procd field 314 of the read_checkpoint table 310 entry for the identified queue. However, these changes are not committed to the queue tables 234 until element 826 commits all such changes in the application database 232.

One of ordinary skill in the art will readily recognize that the daemon background processing described above in FIGS. 7 and 8 may be implemented in a variety of programming constructs dependent upon the requirements of a particular computing system. For example, in a multi-tasking computational environment such as UNIX or Microsoft Windows NT, the daemon processing and application processing may be independent processes. The state of such a process (e.g., started or dormant) may be controlled using standard signal functions for interprocess communication features of the operating system environment.

Alternative Queue Data Structures

One of ordinary skill in the art will readily recognize many equivalent data structures useful to implement the balanced queue structures of the present invention. In particular, various forms of indirection through use of pointers may be useful to implement the balanced queue structures. Similarly, other data structures may be useful in providing for dynamic resizing of the balanced queue structures.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A balanced queue computer communication system for exchanging messages between an originating process and a receiving process, said balanced queue communication system comprising:

a first memory device associated with said originating process;

a second memory device associated with said receiving process;

a communication medium connecting said originating process and said receiving process for the exchange of messages therebetween;

a first wraparound queue associated with said originating process stored in said first memory device and having a plurality of locations;

a second wraparound queue associated with said receiving process stored in said second memory device and having a plurality of locations, wherein the number of locations in said second wraparound queue is equal to the number of locations in said first wraparound queue;

means associated with said originating process for retrieving a message from said first wraparound queue and for transmitting said message via said communication medium to said receiving process with indicia of the location from which said message was retrieved; and means in said receiving process for receiving said message and said indicia and for storing said message in said second wraparound queue at a location corresponding to said indicia.

2. The system of claim 1 wherein said first wraparound queue includes:

pointer means for identifying a next available location in said first wraparound queue for the storage of one of said messages.

3. The system of claim 2 further comprising:

means within said originating process for storing said messages in said first wraparound queue at the next available location therein indicated by said pointer means; and means within said originating process for modifying said pointer means to indicate the next available location in said first wraparound queue.

4. The system of claim 1 further comprising:

recovery management means for automatic recovery of data stored in said first memory device and in said second memory device.

5. The system of claim 4 wherein said means within said originating process are cooperatively operable with said recovery management means to ensure automatic recovery of said first wraparound queue in case of failure of said first memory device.

6. The system of claim 4 wherein said means within said originating process are cooperatively operable with said recovery management means to ensure automatic recovery of said first wraparound queue in case of failure of said communication medium.

7. In a distributed computing application having an originating process and a receiving process, a method for exchanging messages between said originating process and said receiving process comprising the steps of:

(a) storing a message in a first location of a first wraparound queue in association with operation of said originating process;

(b) retrieving said message from said first wraparound queue;

(c) transferring said message and indicia of said first location to said receiving process;

(d) storing said message in a pre-determined location of a second wraparound queue in association with operation of said receiving process, wherein said pre-determined location of said second wraparound queue is determined by said indicia of said first location; and (e) retrieving said message from said second wraparound queue.

8. The method of claim 7 wherein said first location is the next available location as indicated by a next location indicia stored in association with said first wraparound queue, and wherein the storing step (a) includes the step of:

modifying said next location indicia to indicate the next available location in said first wraparound queue in response to the storage of said message in said first wraparound queue.

9. The method of claim 8 wherein said originating process is operable on a computing system having first recovery management techniques integrated therewith, and wherein storing step (a) includes the step of committing changes in said first wraparound queue to said first recovery management techniques.

10. The method of claim 9 wherein said receiving process is operable on a computing system having second recovery management techniques integrated therein, and wherein storing step (d) includes the steps of:

committing changes in said second wraparound queue to said second recovery management techniques; and acknowledging, responsive to the commitment of changes in said second wraparound queue, said message to said originating process.

11. The method of claim 10 further comprising the steps of:

removing said message from said first wraparound queue in response to the acknowledgment of said message; and committing changes in said first wraparound queue to said first recovery management techniques in response to the removal of said message therefrom.

12. The method of claim 10 wherein the retrieving step (e) includes the steps of:

removing said message from said second wraparound queue; and committing changes in said second wraparound queue to said second recovery management techniques in response to the removal of said message therefrom.

13. A program storage device readable by a computer, tangibly embodying a program or instructions executable by the computer to perform method steps for exchanging messages in a distributed computing application between an originating process and a receiving process, said method steps comprising:

(a) storing a message in a first location of a first wraparound queue in association with operation of said originating process;

(b) retrieving said message from said first wraparound queue;

(c) transferring said message and indicia of said first location to said receiving process;

(d) storing said message in a pre-determined location of a second wraparound queue in association with operation of said receiving process, wherein said pre-determined location of said second wraparound queue is determined by said indicia of said first location; and (e) retrieving said message from said second wraparound queue.

14. The program storage device of claim 13 wherein said first location is the next available location as indicated by a next location indicia stored in association with said first wraparound queue, and wherein the method storing step (a) includes the step of:

modifying said next location indicia to indicate the next available location in said first wraparound queue in response to the storage of said message in said first wraparound queue.

15. The program storage device of claim 14 wherein said originating process is operable on a computing system having first recovery management techniques integrated therewith, and wherein the method storing step (a) includes the step of committing changes in said first wraparound queue to said first recovery management techniques.

16. The program storage device of claim 15 wherein said receiving process is operable on a computing system having second recovery management techniques integrated therein, and wherein the method storing step (d) includes the steps of:

committing changes in said second wraparound queue to said second recovery management techniques; and acknowledging, responsive to the commitment of changes in said second wraparound queue, said message to said originating process.

17. The program storage device of claim 16 the method further comprising the steps of:

removing said message from said first wraparound queue in response to the acknowledgment of said message; and committing changes in said first wraparound queue to said first recovery management techniques in response to the removal of said message therefrom.

18. The program storage device of claim 16 wherein the method retrieving step (e) includes the steps of:

removing said message from said second wraparound queue; and committing changes in said second wraparound queue to said second recovery management techniques in response to the removal of said message therefrom.

19. A system for transmission and reception of messages in a distributed processing environment, said system comprising:

a send queue, associated with an originating node, comprising at least one table having a plurality of entries in a first application database within said originating node, wherein each entry may store a message;

a first background processing element, operable within said originating node, which retrieves entries from said send queue and transmits a message stored in said retrieved entries to a receiving node;

a receive queue, associated with said receiving node, comprising at least one table having a plurality of entries in a second application database within said receiving node, wherein said receive queue adapted to receive and store a received message transmitted by said first background processing element; and a second background processing element operable within said receiving node which monitors said receive queue to start processing received messages stored in entries of said receive queue, wherein an index value indicative of the location of each entry retrieved from said send queue is transmitted with the message stored in the entry to said receiving node.

20. The system of claim 19 wherein said receiving node includes:

means for acknowledging to said originating node receipt of a transmitted message.

21. The system of claim 19 wherein said send queue and said receive queue have an identical number of entries and wherein said receive queue includes:

means for storing a received message in said receive queue in an entry location indicated by said index value received with said received message.

* * * * *